3,073,771
Patented Jan. 15, 1963

3,073,771
NUCLEAR REACTORS
Maurice Pierre André Moulin, Gif-sur-Yvette, France, assignor to Commissariat a l'Energie Atomique, Paris, France, a state administration of France
Filed Mar. 13, 1958, Ser. No. 721,138
Claims priority, application France Mar. 18, 1957
4 Claims. (Cl. 204—193.2)

The present invention relates to nuclear reactors with the devices to be included in such reactors for having access to the channels of the core thereof from the outside of these reactors, especially for purposes of control, observation, repairing, etc., said reactors being preferably cooled by a circulation of fluid under pressure.

The chief object of the present invention is to reduce as much as possible the number of the orifices provided in the reactor shield which separates said channels from the outside of the reactor.

In such reactors it is known to use at least one distributing tube for communication between the inside and the outside of the shield, said tube being movably supported with respect to said shield so that it constantly passes through a point fixed with respect to the core and located opposite the outlets of the channels.

According to the present invention, means carried by the shield are provided for displacing said tube along its own axis so that it can be introduced into or removed from said channel outlets.

It is known that, in order to keep a reactor in good working order, it is necessary to be able to proceed to various operations such as: refueling, control of the reactivity by introduction into the active portion of the core of a variable number of control rods, optical examination of the inner channels, removal of fuel cans wedged in the channels, etc.

In order to solve these various problems, when the core of the reactor is contained in a shield under pressure, it is necessary to reduce to a minimum the number of openings provided in said shield, this both from the point of view of the resistance of the materials and from that of fluid-tightness.

It has already been proposed in the French patent Ser. No. 721,779, filed on September 11, 1956, in the first addition to this patent Ser. No. PV. 57,846, filed on October 23, 1956, and in the second addition Ser. No. PV. 730,231, filed on January 23, 1957, in the name of Commissariat à l'Energie Atomique, for the same purpose to make use of a hollow arm mounted so as to be able to pivot about a fixed point, one end of this arm being adapted to be connected with the outside of the reactor and this end (or, preferably, its other end) being adapted to be brought successively opposite the outlets of at least some of the channels of the reactor, said channels opening into a spherical surface the center of which coincides with said fixed point.

Such an arrangement permits of reducing the number of openings provided in the shield since it suffices to have a single opening to cooperate with all the channels opening into the said spherical surface.

However such an arrangement calls for a very high accuracy of adjustment of the parts.

In order to dispense with this necessity, according to the present invention, the pivoting arm or tube is made slidable along its own longitudinal axis, under the effect of suitable means, so that its end may be introduced into any of the outlets of the channels intended to cooperate with said tube.

In view of the fact that said tube is slidable longitudinally, it is no longer necessary to have the channel openings located in a concave spherical surface, the only condition to be complied with being that said outlets are directed toward the center of pivoting of the tube.

Such an arrangement may be used in a reactor having horizontal channels, but it is particularly advantageous in the case of a reactor having vertical channels.

In such a reactor, refueling is effected through the under face of the core in any suitable manner, and in particular as disclosed in the above mentioned patent applications.

The control arrangement according to the present invention is provided at the upper part of the reactor. In particular every channel intended to receive a control rod is located under a device such as above mentioned provided with a rectilinear tube the center of pivoting of which is located on the axis of said channel.

The devices according to this invention are distributed in such manner that each of them cooperates with substantially the same number of channels. However as control rods are not necessary in the peripheral portions of the reactor core, the importance of the devices provided in the peripheral portion of the reactor may be substantially different from that of the devices provided in the central portion, the only condition being that the whole of these devices is capable of cooperating with all the channels of the reactor.

Advantageously the outlets of the channels are provided in rigid and compact pieces, preferably of cast iron, bearing upon the moderator lattice if this moderator is a solid material. These outlets are arranged in such manner as to form direct extensions of the upper ends of the vertical channels provided in the moderator, said outlets in the cast iron plates or pieces converging toward the center of pivoting of the corresponding operating device.

Said heavy pieces or plates are connected with the moderator mass in such manner as to be displaced as little as possible under the effect of the various internal stresses (pressure of the coolant gas, thermal effects, "Wigner" effect due to the neutron flux, etc.).

These pieces or plates may perform other functions than that above stated. In the case where the coolant circulates in the upward direction, they may serve for instance to exert a downward pressure on the moderator (graphite) the density of which is such that its weight is hardly higher than the upward action of the forces due to the pressure of the gases. They may serve also to house devices for the individual adjustment of the flow rate, pipes for collecting fluid and thermometers, and so on. They may also be used for attenuating the effect of the radiations on the upper portion of the shield. When the circulation of the coolant takes place in the downward direction, they may possibly serve to the fixation of the main parts for adjustment of the flow rate of said coolant (as a matter of fact, the main adjustment of the flow rate takes place upstream of the channels, and its accurate adjustment downstream thereof).

Under normal conditions of operation of the reactor, the tubes of the respective operating devices corresponding to the control rods are locked in vertical position, which permits a very simple operation of the control rods through said tubes and channels in line with one another.

Preferred embodiments of the present invention will be hereinafter described with reference to the accompanying drawings, given merely by way of example and in which.

Figure 1:
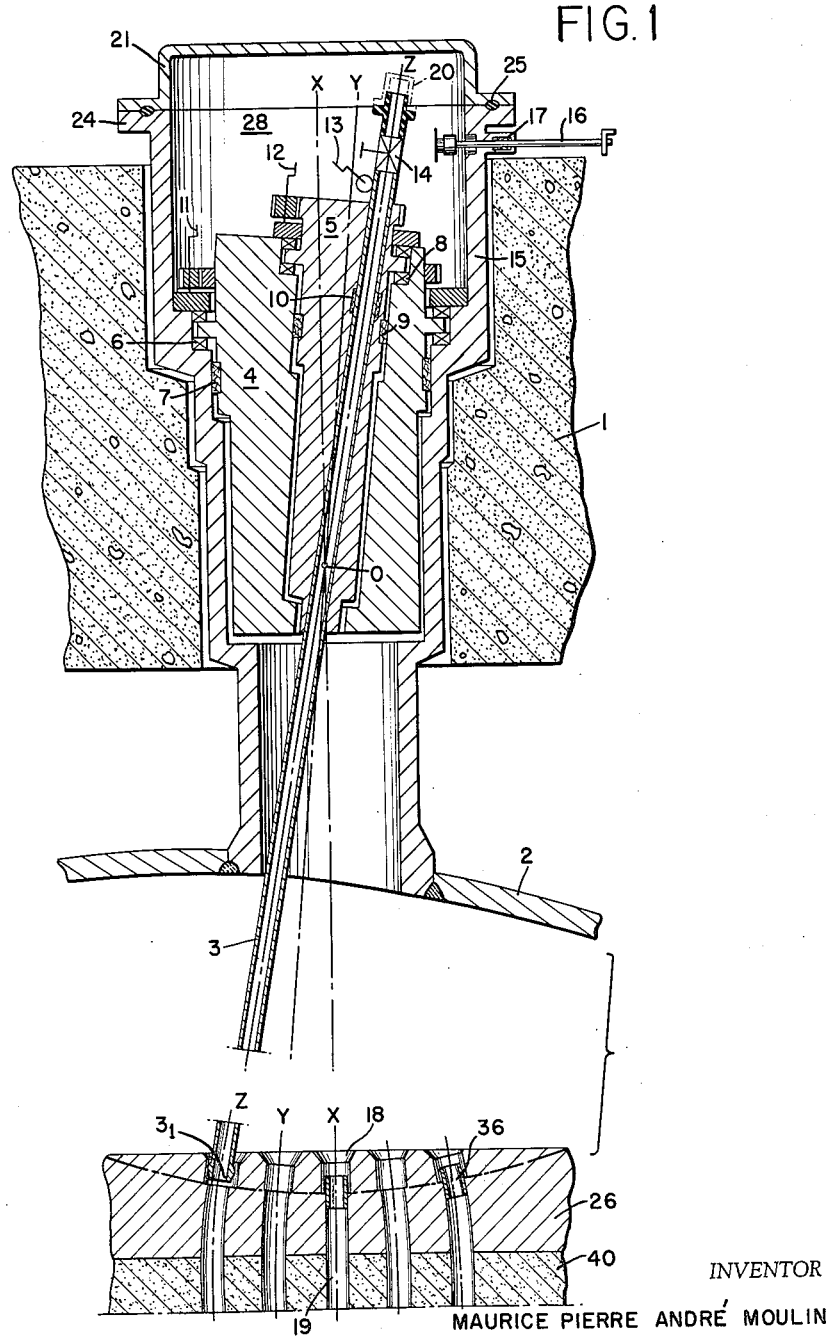
FIG. 1 is a vertical sectional view of an operating device according to the present invention, in a position giving access to any of the channels corresponding thereto.

Every operating device is housed in the concrete mass 1 acting as biological shield. It is connected with the casing 2 of the reactor.

The distributing tube 3 is rectilinear and it pivots about a point O. For this purpose, use is made of two rotating plugs 4 and 5 the respective axes XX and YY of which pass through O. Plug 5 is provided with a passage oblique with respect to YY and the axis ZZ of which passes through point O. Tube 3 is slidable in said passage.

Plug 4 is mounted on a thrust bearing 6 and it is provided with a packing joint 7. Plug 5, which is rotatable in plug 4, is carried by a thrust bearing 8 and it is provided with a packing joint 9. The tube 3 which is slidable in plug 5 is provided with a packing joint 10.

The means for controlling the various rotation movements are shown at 11 and 12, and the means for causing tube 3 to slide in plug 5 are shown at 13 (being constituted for instance by a toothed wheel the axis of which is carred by plug 5 and which cooperates with a rack rigid with tube 3).

The position of tube 3 is approximately indicated by graduations provided on the rotating plugs 4 and 5. The exact position is determined by observing the end of the tube located in proximity with the channels inside the reactor by means of a periscope or a television camera, not shown. Locking means, which also are not shown, serve to fix the various parts in the desired position.

A closing valve 14, disposed on tube 3, may be controlled from the outside of casing 15 by means of a sliding rod 16 passing through a packing joint 17. Correct positioning of valve 14 opposite said rod 16, after various rotations of plugs 4 and 5 and longitudinal displacements of tube 3, is automatically ensured owing to the action of the means for controlling these rotations, by returning tube 3 into its normal position, that is to say along axis XX and engaging its end $3_1$ in the outlet 18 of the central channel 19 corresponding to this tube 3 (position shown by FIG. 2).

A gas-tight cap 20, shown in dotted lines on FIG. 1, may be fixed on the end of tube 3 after removal of cover 21, which constitutes an intermediate chamber between this cap 20 and valve 14. Such an intermediate chamber permits of introducing, if necessary, a measurement or repairing apparatus into a channel of the reactor, with a minimum outflow of contaminated gas, such an apparatus being for instance supported, after it has been introduced into the tube, through means passing through a packing joint mounted in an opening provided in cap 20.

The cover 21 may be replaced by the body of the control apparatus 22 (FIG. 2) for operating a control rod 23. In both cases, a gas-tight fitting on the flange 24 of the device is obtained by means of a joint 25.

The various outlets (18, 38) of the channels (19, 39) of the reactor are provided in a cast iron piece or plate 26 resting on the moderator mass 40, supposed to be made of graphite. These outlets may open into a spherical surface having its center at point O, as diagrammatically shown in dot-and-dash lines on FIGS. 1 and 2; but in the preferred embodiment, illustrated by the drawings, they open into a flat surface, while converging toward point O. They are of flaring shape so as to facilitate the introduction of the end of tube 3. Said end is advantageously reinforced by a kind of ring 41 having a rounded axial section.

Figure 2:
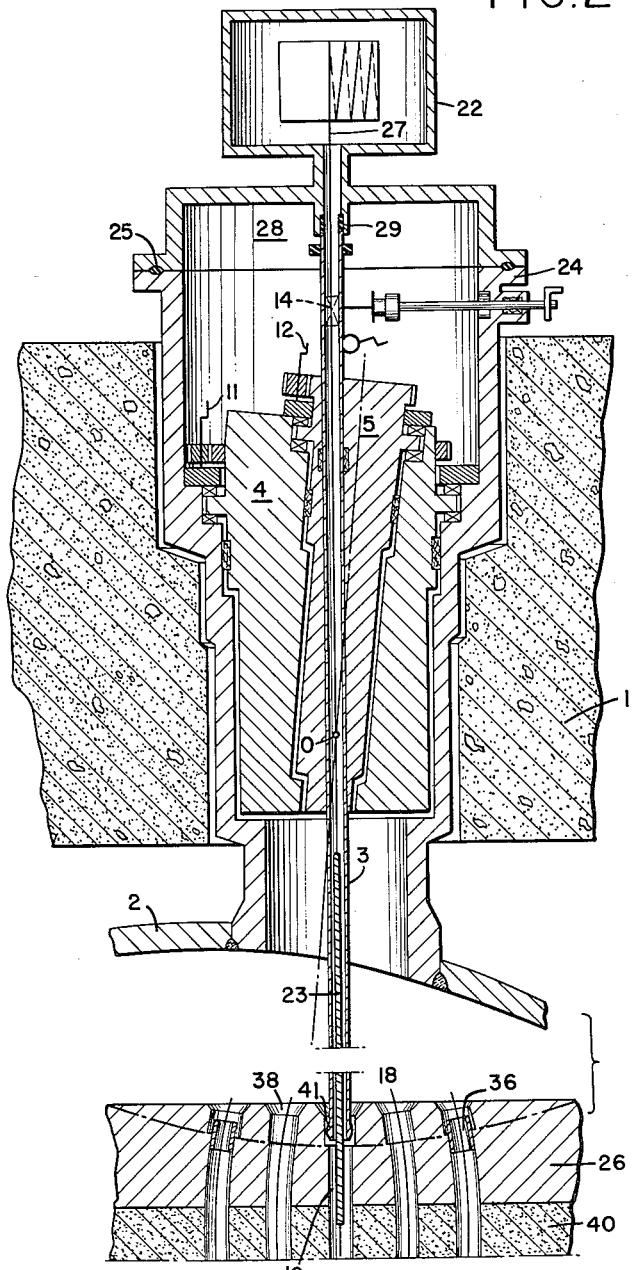
FIG. 2 is a similar view of the same operating device in its normal position permitting operation of a control rod.

Under normal working conditions of the reactor, as shown by FIG. 2, tube 3 is located along the axis of the central channel intended to contain the control rod 23. Its lower end is engaged in the outlet 18 of this channel and the control apparatus 22 is mounted on the whole. The control bar 23 may be safely operated by means of a flexible element such as a cable 27. At its upper end, gas-tightness between tube 3 and chamber 28, which is kept at a pressure slightly higher than that existing on the inside of the reactor so as to avoid gas leakage toward the outside, is ensured by a tight engagement and the provision of a static joint 29.

In the peripheral portion of the reactor (FIG. 3) where control rods are not necessary, the lower end of tube 30 may be slightly bent in order to increase its possibility of angular displacements without increasing the diameter of the orifice 31 provided in casing 2.

Finally, in the intermediate zone of the reactor, between the center and the periphery, where the operation of the control rods may be slower than in the central portion and may be therefore slightly slowed down by friction of these rods against the walls of the tube, it is also possible to have the lower end of tube 32 slightly bent, for the same purpose as above stated.

Figure 3:
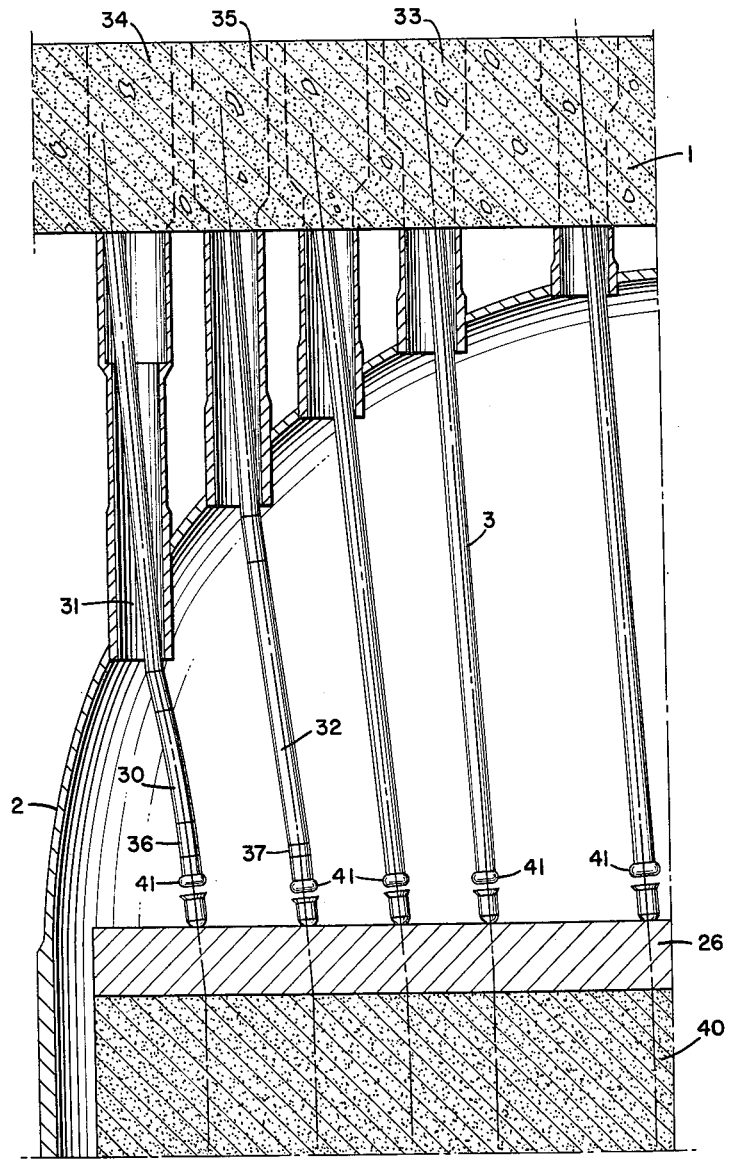
FIG. 3 is a vertical section of a portion of a reactor made according to this invention.

It is often advantageous to give said bent tubes a compensating bending in the close proximity of their lower ends, as shown at 36 and 37 on FIG. 3, so that the lower ends of these tubes are parallel to the direction of their longitudinal sliding.

FIG. 3 shows that the control means 33 for the central portion of the reactor are provided with rectilinear tubes 3 and that the tubes 30 used for the peripheral devices 34 are bent to a greater angle than those 32 provided for intermediate devices 35 which may be used in connection with control rods.

During normal operation of the reactor, the control means 22 are mounted on the devices 33 and 35 the tubes 3 and 32 of which are respectively in line with the channels intended for the control rods, said rods being ready to be introduced in the manner above described, valve 14 being disengaged. The peripheral devices 34 are closed by covers 21.

In all the devices there is provided, in known manner, a sweeping by means of fresh gas in chamber 28 at a pressure slightly higher than that existing in the reactor so as to avoid contamination of the upper portion of the device and to attenuate its heating by the tube.

If it is desired to make use of an operating device for other purposes than that of operating a control rod, the following operations are to be performed previously:

For devices 33 and 35, the cable 27 must be separated from the control rod 23 (the coupling systems may be controlled automatically from a distance and use made of any magnetic, mechanical, pneumatic or other means for this purpose), then said rod is left in the reactor so as to ensure stopping thereof and cable 27 is lifted into the control apparatus 22, after which valve 14 is closed and apparatus 22 is removed; and For peripheral devices 34, cover 21 is removed.

If for instance a fuel can has wedged in a reactor channel, after plugs 4 and 5 have been suitably rotated and tube (3, 30 or 32) has been engaged into the outlet 38 of the desired channel 39, valve 14 is operated and tools for removing and extracting the individual flow rate adjustment device 36 which controls channel 39 are passed through said tube, whereby it is possible to determine the nature and the importance of the incident and to choose the tools necessary for repairing.

The withdrawal of the fuel can or cans may take place either at the top of the reactor, in a lead box, or by causing said can or cans to move down in the adacent channel from which the cans present therein have been previously removed. In this last case, the cans may be withdrawn from the reactor through a discharging device already provided at the bottom of the reactor, without requiring special precautions.

If it is necessary, to extract the can that has been damaged, to cut the fins thereof, a suitable tool may be introduced into the tube for performing this work.

After extraction of the damaged fuel can or cans and if there has been a contamination of the channel, cleaning means such as a rotary brush and a suction apparatus, or any other means, may be introduced through the tube.

The operating devices according to the invention also permit of having access to the individual flow rate adjustment devices 36, so as to adust them to the desired value.

They also permit of introducing into the reactor thermo-couples or correcting tubes, supplementary tubes for collecting the coolant, etc.

Other apparatus, such as optical systems, may be introduced through tubes such as 3, 30, 32.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

I claim:

1. In a nuclear reactor including a core provided with a plurality of channels and a shield surrounding said core, the combination of a first plug extending through said shield, gas tight means for mounting said plug rotatably in said shield about a fixed axis, said plug being provided with a cylindrical housing, the axis of said housing being at an angle to said fixed axis and intersecting it at a point which is fixed with respect to said shield, said housing extending from one side of said plug to the other side thereof, a second plug mounted with a gas tight fit in said first plug so as to be rotatable therein about the axis of said housing, said second plug being provided with a cylindrical passage extending from one side thereof to the other side, the axis of said passage being at an angle to the axis of said housing and intersecting it at the fixed point where the axis of said housing intersects the fixed axis of rotation of the first plug, the end face of said core turned toward said plug being flat, means in said end face forming inlets for a plurality of said channels, respectively, said channel inlets converging toward said fixed point, a straight tube slidable with a gastight fit along its longitudinal axis in said cylindrical passage, said tube extending on both sides of said second plug and being open at both ends, one end of said tube being shaped and dimensioned to fit in any of said inlets, and means carried by said second plug for causing said tube to slide in said passage so that it can be engaged in, or removed from, any of said channel inlets.

2. A combination according to claim 1 in which said inlets are of flaring shape to accommodate said end of said tube.

3. A combination according to claim 1 in which said inlets are provided in a common rigid plate, said inlets opening all in a flat surface of said plate.

4. A combination according to claim 1 in which said channels are vertical, said fixed point being located along the axis of one of said channels, further including means for introducing a control rod into said last mentioned channel.

References Cited in the file of this patent

UNITED STATES PATENTS 2,782,158     Wheeler  ---------------- Feb. 19, 1957

OTHER REFERENCES

Nucleonics, vol. 14, No. 12, December 1956, pp. S22–S23.

Amorosi et al.: Commercial and International Developments of Atomic Energy, Sheraton-Park Hotel, Wash., D. C., Sept. 27–29, 1955, p. 18.

Hughes et al.: Problems in Nuclear Engineering, vol. I, pp. 267–277. Dec. 3, 1955, Pergamon Press, New York.

Barnes et al.: Proceedings of the International Conference on the Peaceful Uses of Atomic Energy, vol. 3, pp. 330–344, Aug. 8–20, 1955, United Nations, New York.

McLain et al.: "Methods of Refueling Heterogen Nuclear Reactors," 1st Nucl. Eng. & Sci. Cong., Cleveland, Ohio, "Problems in Nuclear Engineering," Dec. 3, 1955.

Nucleonics II, June 1955, pp. 52, 53, 54.

Nucleonics III, November 1956, vol. 14, No. 11, pp. 138–144.